US006582495B2

(12) United States Patent
Chau et al.

(10) Patent No.: US 6,582,495 B2
(45) Date of Patent: Jun. 24, 2003

(54) PROCESS FOR PREPARING SUPPORTED ZEOLITIC MEMBRANES BY TEMPERATURE-CONTROLLED CRYSTALLISATION

(75) Inventors: Christophe Chau, Rueil Malmaison (FR); Isabelle Prevost, Rueil Malmaison (FR); Jean-Alain Dalmon, Lyons (FR); Sylvain Miachon, Lyons (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/067,533

(22) Filed: Feb. 7, 2002

(65) Prior Publication Data

US 2003/0084786 A1 May 8, 2003

(30) Foreign Application Priority Data

Feb. 7, 2001 (FR) ............................................ 01 01746

(51) Int. Cl.[7] ......................... B01D 53/22; B01D 71/02
(52) U.S. Cl. ........................... 95/45; 96/11; 423/328.2; 502/77; 502/78; 502/79
(58) Field of Search ..................... 95/45; 96/4.11; 423/328.2; 502/77–79

(56) References Cited

U.S. PATENT DOCUMENTS

| 5,089,243 | A | | 2/1992 | Thome et al. | |
|---|---|---|---|---|---|
| 5,310,714 | A | * | 5/1994 | Grasselli et al. | 502/64 |
| 5,716,527 | A | * | 2/1998 | Deckman et al. | 210/651 |
| 5,723,397 | A | | 3/1998 | Verduijn | |
| 5,827,569 | A | * | 10/1998 | Akiyama et al. | 427/243 |
| 5,935,440 | A | * | 8/1999 | Bratton et al. | 210/500.25 |
| 5,968,366 | A | * | 10/1999 | Deckman et al. | 210/651 |
| 6,039,792 | A | * | 3/2000 | Calamur et al. | 95/45 |
| 6,074,457 | A | * | 6/2000 | Anthonis et al. | 95/45 |
| 6,090,289 | A | * | 7/2000 | Verduijn et al. | 210/644 |
| 6,193,784 | B1 | * | 2/2001 | Yazawa et al. | 95/45 |
| 6,387,269 | B1 | * | 5/2002 | Eltner et al. | 210/640 |
| 6,395,067 | B1 | * | 5/2002 | Kuznicki et al. | 95/47 |
| 6,440,885 | B1 | * | 8/2002 | Pierotti et al. | 502/4 |
| 6,472,016 | B1 | * | 10/2002 | Soria et al. | 427/245 |
| 2001/0012505 | A1 | * | 8/2001 | Matsukata | 423/710 |
| 2002/0062737 | A1 | * | 5/2002 | Guiver et al. | 96/11 |

FOREIGN PATENT DOCUMENTS

WO  WO 00/33948  5/2000

* cited by examiner

*Primary Examiner*—Robert H. Spitzer
(74) *Attorney, Agent, or Firm*—Millen, White, Zelano & Branigan, P.C.

(57) ABSTRACT

A process is described for preparing a supported zeolite membrane constituted by a composite continuous zeolite/support layer of controlled thickness, wherein the zeolitic phase is principally localized in the pores of a porous support and optionally on the external surface thereof, the process comprising at least the formation of a precursor gel of the zeolite, bringing the gel into contact with the support and crystallizing the zeolite. The zeolite is crystallized by carrying out a thermal program comprising at least three steps in succession: a first constant temperature stage carried out at a temperature in the range 50° C. to 300° C., cooling to a temperature of strictly less than 50° C. followed by a second constant temperature stage carried out at a temperature range of 50° C. to 300° C. The prepared membrane is used in particular in processes for separating gas or separating liquids.

19 Claims, No Drawings

PROCESS FOR PREPARING SUPPORTED ZEOLITIC MEMBRANES BY TEMPERATURE-CONTROLLED CRYSTALLISATION

The invention relates to a process for controlled production of supported zeolite membranes, to the membranes obtained and to their use in separation processes.

Zeolites have the principal advantages of having a crystalline structure and a defined pore size, of having modifiable surface properties (in particular in terms of hydrophilic nature/organophilic nature and acidity) and linked to the chemical composition of the framework. The particular topology of zeolites and their cation exchange properties means that they can be used for applications of separation by selective adsorption or for catalytic reactions. For a given structural type, connected to the crystalline family to which each zeolite belongs (these structure types have been described in the work by Meier, W. M., Olson, D. H., in "Atlas of Zeolite Structure Types" (1992), Butterworth-Heinemann, Ed.), separation of molecules present in a mixture can take place by selective adsorption and/or size exclusion in particular. However, separation on a powdered zeolite is a discontinuous process. In contrast, a zeolite membrane offers the possibility of separating molecules by a continuous process, which may be particularly advantageous from a technological and economical viewpoint.

A variety of processes for producing zeolite membranes have already been described. The hydrothermal route using porous supports has the advantage of stabilising the zeolite crystals in a porous matrix (alumina, stainless steel, for example) and at the surface thereof. European patent application EP-A-0 778 075 describes a process for producing zeolite membranes supported by porous glass. United States patent U.S. Pat. No. 5,429,743 and International patent application WO-A-95/29751 describe protocols for producing composite membranes supported by an inorganic macroporous matrix. Reference can also be made to documents U.S. Pat. No. 4,099,692, WO-A-93/19840, U.S. Pat. No. 5,567,664 and WO-A-96/01683. International patent application WO-A-00/33948 describes a process for producing composite zeolite membranes supported on tubular solids that are optionally multi-channelled. Such composite zeolite-based membrane materials are formed from a zeolitic phase deposited on a support.

Such preparations of membrane materials are carried out by isothermal heat treatment of a mixture containing precursors of the zeolitic phase, which is active for separation. Crystallisation is carried out at a fixed temperature maintained during that step of the synthesis (isothermal treatment). The zeolite crystallisation step can also be repeated a number of times. The synthesis is then reproduced after optionally cooling the material to ambient temperature, washing and drying of said material. The operations are identical and enable successive layers and/or zeolite crystals to be deposited that fill the interparticular spaces. In such cases, the preparation period is considerably prolonged. That mode of multi-step synthesis also encourages the production of thick layers of zeolites, which can crack when calcining the membrane (Vroon, Z. A. E. P., Keizer, K., Burggraaf, A. J., Verweij, H., *J. Membr. Sci.* 144 (1998) 65–76). Further, increasing the thickness can considerably limit the transfer of material through the membrane during the separation operation, thus reducing the technical and economic advantage of the membrane separation operation, due to a reduction in the productivity of the separation step. Further, this mode of multi-step synthesis requires a large quantity of precursors for the zeolitic phase, which considerably increases the cost of the starting materials and the precursors used. It also has the disadvantage of prolonging the period for producing the membrane material and augmenting the operating cost of the separation operation.

Apart from the membrane material preparation field, zeolite crystals (powdered material) have been obtained during polythermal preparations, carried out at different temperatures as the reaction progresses, in the absence of a support. U.S. Pat. No. 5,089,243 describes preparing alumino-silicate powders using a two-step crystallisation process in the absence of an organic agent. The first step is carried out at 240° C. to 325° C. for 1 to 20 minutes. The second step is carried out between 120° C. and 225° C. for 1 to 100 hours. Recently, non-supported zeolite crystals have been obtained by raising the temperature during synthesis (Li, Q., Creaser, D., Sterte, J. *Microporous and Mesoporous Mater.* 31 (1999) 141–150). A first step is carried out at 60° C. or 80° C. and enables the number and density of the crystals to be controlled. Raising the temperature to 100° C. encourages crystallite growth. In those two types of preparation, the materials obtained are powders, in the form of divided solids, and in no case constitute membrane materials with a solid continuous layer for use in separation.

One of the difficulties of preparing zeolite-based membranes resides in controlling zeolite crystallisation to obtain zeolite crystals that are properly bound to the support, principally localised in the pores of the support, forming a continuous composite zeolite/support layer (obtained by obstructing the voids in the support with crystals of the zeolitic phase) and preferably sufficiently fine to limit the resistance to transfer through the membrane material. The majority localisation of the zeolitic phase in the pores of the support endows it with very good thermal resistance and mechanical resistance of the membrane material. However, it is not excluded that a minor portion of the zeolitic phase is localised on the external surface of the support. One of the essential aims of the present invention is to provide a method for controlled production of supported zeolite membranes in which the zeolitic phase has the characteristics described above. The zeolitic membranes obtained by the process of the invention have better separating power than membranes synthesised in accordance with prior art methods. They also have very high structural integrity, i.e., an absence of defects in the structure of the zeolitic phase and an absence of interparticular spaces, i.e., the voids present between the zeolite crystals.

The present invention concerns a process for preparing a supported zeolite membrane constituted by a composite continuous zeolite/support layer of controlled thickness, wherein the zeolite crystals are principally localised in the pores of a porous support and optionally on the external surface thereof. This preparation method comprises at least the formation of a precursor gel of said zeolite, bringing said gel into contact with said support and crystallising the zeolite from said gel. The preparation process of the invention is characterized in that said zeolite is crystallised by carrying out a non-isothermal thermal programme comprising at least three steps in succession constituted by a first constant temperature stage carried out at a temperature in the range 50° C. to 300° C. followed by cooling to a temperature of strictly less than 50° C. followed by a second constant temperature stage carried out at a temperature in the range 50° C. to 300° C. This preparation process of the invention can produce high performance materials for separation in a single step (one-pot crystallisation).

The first constant temperature stage is preferably carried out at a temperature in the range 80° C. to 220° C. This first constant temperature stage is maintained for a period in the range 1 hour to 15 days, preferably in the range 3 hours to 72 hours.

The reduction in temperature from the first constant temperature stage is such that the mixture is cooled to a temperature that is strictly less than 50° C., preferably less than 40° C. and is maintained at that temperature for a period of 1 minute to 72 hours, preferably in the range 20 minutes to 9 hours, more preferably 30 minutes to 5 hours.

The second constant temperature stage is preferably carried out at a temperature in the range 80° C. to 220° C., more preferably carried out at a temperature equal to that of the first constant temperature stage. This second constant temperature stage is maintained for a period in the range 1 hour to 15 days, preferably in the range 3 hours to 72 hours.

The process for producing the zeolitic membrane of the invention comprises at least (a) forming a gel (or a solution) constituted by a mixture of precursors for the zeolite containing the agents necessary for the formation of said gel and bringing it into contact with the porous support, (b) crystallising the zeolite from said gel using a non isothermal thermal programme as defined above and including, in succession, at least one constant temperature stage at a temperature in the range 50° C. to 300° C., cooling to a temperature strictly less than 50° C. followed by a second constant temperature stage at a temperature in the range 50° C. 300° C. and finally (c) eliminating residual agents.

This process results in a supported zeolitic membrane constituted by a composite zeolite/support layer, which is continuous and thin, wherein the zeolitic phase formed from zeolite crystals is principally localised in the pores of a porous support and optionally on the external surface of said support, to allow good adhesion of the zeolite to the support and increased thermal and mechanical resistance of the composite material. Further, the thickness of this layer and the crystal size and morphology are controlled. The thickness is controlled by the quantity of gel, and thus in particular by the quantity of zeolite precursor agents used in the preparation, incorporated into the porous matrix. The size and morphology depend on the relative proportions of the different constituent reactants of the precursor gel of the zeolite. As a result, this process can produce thin layers that are particularly suitable for use in separation.

More precisely, in the process of the invention, the support is constituted by a porous material wherein the total pore volume fraction is more than 5%, preferably more than 40%, and wherein the pore diameter is in the range 4 nanometers to 100 micrometers, preferably in the range 4 nanometers to 10 micrometers. The support is constituted by a material that is preferably inorganic, but it may be organic, metallic or mixed in nature. A ceramic support based on alumina and/or zirconia and/or titanium oxide is a suitable example. Other materials of the following nature may also be suitable: carbon, silica (aerogel, porous silica), zeolites, clays, glass (sintered glass, Vycor® glass, glass microfibres), polymers, metals (stainless steel, silver). The use of an alumina support of the allotropic alpha or gamma type (in particular an alpha alumina) is preferred. This support can optionally be constituted by a plurality of layers of varying porosity. The support can have any geometry, for example tubular, coiled, flat, in the form of a disk, a sheet or fibres.

The porous support is brought into contact with a solution containing the agents necessary for the formation of the zeolite precursor gel. Said solution containing the hydrolysable framework sources is constituted by these sources, either pure or diluted. The hydrolysable framework elements are susceptible of producing tetrahedra of the $TO_4$ type (where T represents an element selected from Si, Al, B, Ga, Ge and P) are preferably constituted by alkoxides in the case of silicon or aluminium and/or silicon tetrachloride, and/or aluminium trichloride and/or aluminium salts such as aluminium sulphate and/or sodium aluminate. Highly preferably, they are silicon and/or aluminium alkoxides. The solution preferably contains water and is optionally supplemented with a polar organic molecule and/or one of several aids to the reaction for forming the zeolite precursor gel and/or one or more aids to zeolite crystallisation.

Aids for the gel formation reaction are constituted by mineral and/or organic acids or bases that act as catalysts. Hydrochloric and hydrofluoric acid, sodium hydroxide and ammonia are suitable examples.

Aids for the zeolite crystallisation reaction are constituted by acids or bases and/or salts of minerals and/or organic compounds and/or undissociated molecules essentially acting as mobilising agents and/or structuring agents (structure-promoting agents/templates) and ensuring the neutrality of the charge on the framework as counter-ions. Hydroxide or fluoride ions are the principal mobilising agents and are introduced into the preparation medium, for example in the form of sodium hydroxide, organic hydroxides and hydrofluoric acid. These mobilising agents allow the precursors to dissolve. A variety of mineral or organic templates may be suitable: hydrated cations (sodium or potassium ions), ion pairs (ammonium or phosphonium ions and the corresponding anions) or neutral molecules (amines, alcohols or ethers). The most frequently used crystallisation aids are tetrapropylammonium hydroxide or bromide or a mixture of the two, sodium and potassium hydroxides, ammonia, hydrofluoric acid and ethers such as crown ethers and cryptands.

The first gel formation step consists of drying the porous support, cooling it to ambient temperature and impregnating it with the solution containing the sources of the hydrolysable framework elements. The support can be dried at a temperature in the range 40° C. to 600° C., for a period in the range 1 minute to 48 hours. It is preferably carried out between 60° C. and 80° C. overnight. Impregnation preferably consists of immersing the support in the solution. However, other methods can be used, for example depositing the solution on the surface of the porous support. Impregnation can be carried out at a temperature in the range –20° C. to 200° C., for a period in the range from 1 minute to 72 hours, and at a pressure in the range $10^{-5}$ atmospheres to 1 atmosphere. As an example, impregnation can be carried out at ambient temperature for 30 minutes and at a pressure of $2\times10^{-2}$ atmospheres.

The zeolite is then crystallised hydrothermally. To this end, the reaction mixture resulting from the first step for gel formation and contact with the porous support is placed in a polytetrafluoroethylene (PTFE) lined autoclave as described, for example, in EP-A-0 778 076, and the mixture is then subjected to temperature programming under autogenous pressure. The first zeolitic stage crystallisation phase is carried out at a temperature in the range 50° C. to 300° C., preferably in the range 80° C. to 220° C. and for a period in the range 1 hour to 15 days, preferably in the range 3 hours to 72 hours. The to mixture is cooled in a second stage to a temperature that is strictly less than 50° C., preferably less than 40° C., and highly preferably, it is cooled to ambient temperature and maintained at that temperature for a period of 1 minute to 72 hours, preferably 20 minutes to 9 hours and more preferably 30 minutes to 5 hours. The system is then heated to a higher temperature between 50° C. and 300° C., preferably between 80° C. and 220° C. and more preferably to the temperature of the first stage for a period in the range 1 hour to 15 days, preferably in the range 3 hours to 72 hours.

The membrane formed is cooled to ambient temperature for washing to at least partially eliminate the aids to the gel formation reaction and/or those for the zeolite crystallisation reaction. Washing is preferably carried out with distilled water. The membrane is then dried, preferably in the range 60° C. to 80° C., for a period in the range 2 hours to 24 hours, and cooled to ambient temperature.

The preceding gel formation reactions followed by zeolite crystallisation using the non isothermal temperature programme of the invention, then cooling the membrane, washing then drying the material, can be repeated a number of times.

The membrane is then calcined by steadily increasing the temperature to a temperature in the range 300° C. to 800° C., preferably in the range 350° C. to 600° C. This temperature rise can be carried out continuously or in constant temperature stages for a period in the range 5 hours to 50 hours. The calcining temperature is then maintained at that value for a period in the range 10 minutes to 24 hours. The membrane is then gradually cooled to ambient temperature. Cooling can be carried out continuously or in constant temperature stages for a period in the range 1 hour to 24 hours.

The high quality of the membranes obtained from the process of the invention, as will be shown in the following examples, has no connection with the rates of temperature rise (temperature gradient) when carrying out the non isothermal thermal programme.

This process can be applied to all zeolites, i.e., all crystalline solids characterized by a structure comprising a three-dimensional framework resulting from a concatenation of $TO_4$ type tetrahedra (where T=Si, Al, B, Ga, Ge and/or P), each oxygen atom being common to two tetrahedra, and channels and cavities with molecular dimensions. Suitable examples are structure types FAU, GME, MOR, OFF, MFI, MEL, FER, LTA and CHA, using the IUPAC nomenclature (Meier, W. M., Olson, D. H., in "Atlas of Zeolite Structure Types" (1992), Butterworth-Heinemann, Ed.).

This process can also be applied to any solid resulting from a concatenation of $TO_6$ type octahedra (where T=Ti, Mn and/or Mo), for example titanosilicates, or to mesoporous solids of the MCM-41 and MTS (Micelle Templated Solids) type. In the latter case, micellar organic agents are used as crystallisation aids.

The thickness of the continuous zeolite layer is controlled by the quantity of gel incorporated. This thickness is in the range 0.5 to 100 micrometers, preferably in the range 1 to 50 micrometers. To limit the resistance to molecular transfer through the material during its application, the thickness is highly preferably in the range 1 to 15 micrometers. The crystal size and morphology depends on the relative proportions of the different constituent reactants of the gel. Crystals formed in a highly basic medium are generally small, of the order of a few micrometers to a few tens of micrometers. The more basic the medium, the smaller they are and they are then confined to the pores of the support employed.

The membranes obtained by the process of the invention are advantageously used in gas separation processes (gas or vapour permeation) or for separating liquids (pervaporation), optionally in filtration and electrophoresis processes. Separation processes that can be mentioned are:

separating linear and branched isomers of hydrocarbons containing 4 to 8 carbon atoms (C4 to C8);

separating paraffinic C6 and C7 isomers depending on the degree of branching (mono-, di-, tri-branched);

separating xylene isomers;

separating a methane/nitrogen mixture;

separating a hydrogen/hydrocarbon mixture (for example n-butane);

or separating a methane/carbon dioxide mixture.

The invention will be described in more detail with reference to non limiting examples 1 to 5. Example 2 is provided by way of comparison.

The entire disclosures of all applications, patents and publications, cited above or below, and of corresponding French application No. 01/01.746, filed Feb. 7, 2001, is hereby incorporated by reference.

EXAMPLES

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

Example 1

Preparation of a Zeolitic Membrane by Programmed Temperature Crystallisation (Invention)

A tubular 150 mm long alpha-alumina support (sold by US Filter) with a mean pore diameter of 0.2 micrometers was dried at 80° C. overnight, cooled to ambient temperature in a desiccator lined with silica gel, and weighed. It was immersed in an aqueous solution containing silicon (3 g of Aerosil, Degussa), to which 25 ml of an aqueous molar tetrapropylated ammonium hydroxide solution that had previously been stirred at ambient temperature for 72 hours had been added. This step, maturation or ageing, allowed the silica source to partially depolymerise under the action of the mobilising agents. Centrifuging eliminated certain oligomers or any other species present in the medium the size and nuclearity of which were not perfectly suited to diffusion into the macroporous lattice of the support. The support and the solution were placed in an autoclave, which was introduced into an oven maintained at 170° C. for 8 h. At this stage, the programming of the oven cooled the system to ambient temperature then maintained at ambient temperature, which required 9 hours. The mixture was finally re-heated to 170° C. for 72 hours to accomplish the crystallisation step.

At the end of this hydrothermal synthesis phase, the support containing the zeolite was washed with 50 ml of distilled water by immersion for a few minutes. This washing was reproduced three times in succession (about 30 min), checking that the rinsing water was neutral (pH value of close to 7). The material was dried at 80° C. in a stream of nitrogen overnight. X ray diffraction showed that the zeolitic structure obtained was of the MFI type. Prior to the calcining step, the membrane was sealed to nitrogen or methane as the channels of the zeolite were obstructed by organic tetrapropylated ammonium cations. This demonstrates the absence of interparticular spaces between the zeolite crystals and the production of a continuous composite layer.

To free the pores of the membrane by degrading the organic template compound, the material was calcined at high temperature at 500° C. for 4 hours (heating rate: 1.5° C./min; cooling rate: 1° C./min) then cooled to ambient temperature. The weight gain of the support was 0.75 g, corresponding to MFI type crystalline zeolite (pores of 0.5 to 0.6 nm). The zeolite crystallites were localised in the pores of the support and the mean size of the zeolite crystals in the membrane formed was 0.1 to 5 micrometers.

Example 2

Preparation of a Zeolitic Membrane by Isothermal Crystallisation (Comparative)

The operating mode was similar to that described in Example 1, with the exception of the temperature used during the crystallisation phase. The reaction mixture in particular comprising the hydrolysable silica source, the organic compound in aqueous solution and the alpha-alumina support, was prepared using the operating procedure of Example 1. This mixture was placed in an autoclave for a hydrothermal treatment carried out at 170° C. This temperature was maintained throughout the crystallisation phase (isothermal crystallisation). The resulting material was then washed and calcined in an analogous manner to the material prepared in accordance with Example 1.

Example 3

Gas Permeation Measurements Using Pure n-butane and Pure Isobutane

Gas permeation measurements were carried out on the membrane prepared in accordance with Example 1, to characterize the structure and structural quality.

To this end, the membrane was inserted in a permeator (permeation measurement module) with carbon seals that sealed the measurement module. The assembly (module/membrane) was placed in a gas permeation unit and the material was pre-treated at 350° C. in a flow of inert gas such as helium to eliminate any trace of adsorbable gas on the external surface and in the internal pores of the membrane material. This treatment was carried out before changing the gas, so as not to disturb the measurements by eliminating all traces of adsorbed molecules from the micropores and the surface of the material. During the gas permeation measurements, the membrane was subjected to a pressure difference; the pressure of the upstream side where the feed moved (n-butane, pure n-$C_4H_{10}$ to or pure isobutane i-$C_4H_{10}$) was kept constant at 1.5 bars absolute and the pressure on the downstream side, where the permeate was recovered after selective extraction of a portion of the molecules present in the feed, was at atmospheric pressure. This pressure difference constituted the driving force for transfer through the membrane. The flow rate of the gas traversing the membrane was measured using a volume flow meter. The detection threshold was less than 0.002 ml/min, i.e., about $10^{-6}$ mole/$m^2$.s of butane or isobutane.

The permeability of the gas, expressed in mole/$m^2$.s.Pa, is defined as the molar flow rate of that gas per unit area of membrane surface and corrected for the partial pressure difference of this gas between the upstream end (where the gas moves) and downstream end (where the permeate is recovered). The permeability of a gas is therefore the molar flow rate of that gas traversing the membrane per unit surface area and pressure. When measuring the permeability of pure substances, the selectivity a (permselectivity) is the ratio of the permeabilities of n-butane and isobutane.

The flow rates of the gases traversing the membrane were measured with pure butane or isobutane. These molecules have the advantage of having kinetic diameters that are very close to the dimensions of the pore openings in the zeolite (0.55 nm for the MFI structure type, 0.43 nm for n-butane and 0.49 nm for isobutane). The permeabilities were calculated for each gas and their ratio was a measurement of the separation selectivity. It is generally admitted in the literature that MFI type membranes have good textural integrity, i.e., an absence of defects in the structure of the mesopore and macropore type, when the n-butane/isobutane selectivity is more than 10 (Vroon et al., J. Membr. Sci. 113 (1996) 293). It should be noted that because of the choice of these probe molecules, n-butane and isobutane, this test is considered to be a very severe and selective criterion for characterizing microporous inorganic membranes such as zeolites with structure type MFI.

It should be noted that this test for demonstrating structural properties and structural quality is not suitable for all membranes. In particular, it is not suitable for zeolitic membranes in which the zeolite has wide pores such as a zeolite with structure type FAU, with a more open topology and which cannot significantly differentiate between the transport of linear and branched butanes.

TABLE 1

Measurements of flow rates of gases traversing the membrane material prepared in accordance with Example 1 (membrane synthesised in accordance with the invention, programmed crystallisation temperature)

| Gas | Pressure difference (kPa) | Temperature (° C.) | Flow rate* | Permeability** | Selectivity $nC_4/iC_4$ |
|---|---|---|---|---|---|
| n-$C_4H_{10}$ | 50 | 140 | 8.83 | 1.77 | Infinite |
| i-$C_4H_{10}$ | | | <0.001 | 0 | |
| n-$C_4H_{10}$ | 50 | 180 | 10.57 | 2.11 | Infinite |
| i-$C_4H_{10}$ | | | <0.001 | 0 | |
| n-$C_4H_{10}$ | 50 | 220 | 9.08 | 1.82 | Infinite |
| i-$C_4H_{10}$ | | | <0.001 | 0 | |

*mmole/s.$m^2$
**$10^{-7}$ mole/s.$m^2$.Pa

The membrane prepared in accordance with the invention was impermeable to isobutane as flow rates below the analytical detection threshold defined above were not measurable. Its selectivity was infinite for n-butane, representing the excellent quality of the material.

Example 4

Separating Performance of Zeolitic Membrane Materials Prepared in Accordance with the Invention In order to confirm the high quality of membrane materials obtained by the synthesis method of the invention (described in Example 1), three membranes (A, B, C) were prepared using that synthesis procedure. The separation performance was evaluated by gas permeation of a mixture containing hydrogen and n-butane. These molecules were selected because of the specific interactions they have with solid surfaces such as zeolite micropores, and these particular interactions can be exploited to characterize membranes when the operating conditions are judiciously established.

It is known that at low temperatures, for example at ambient temperature and in particular at 20° C., hydrocarbons such as n-butane are strongly adsorbed then diffuse into the pores of a MFI type zeolite in particular, while hydrogen is only slightly adsorbed (as explained in the article by Coronas, J., Falconer, J. L., Noble, R. D., "Characterization of ZSM-5 Tubular Membranes", AIChe J. 43 (1997) 1797, or more recently in the article by Dong, J., Lin, Y. S., and Liu, W., "Multicomponent Hydrogen/hydrocarbon Separation by MFI-type Zeolite Membranes", AIChe J. 46 (2000) 1957 with hydrogen-C1–C4 hydrocarbons). When the membrane has a very good structural and textural quality, n-butane is adsorbed on the material and diffuses through it, while the hydrogen neither adsorbs not diffuses into the micropores of the solid. These properties are connected with the preferential adsorption of the hydrocarbon into the membrane micropores. For a feed containing a mixture of n-butane and hydrogen, we then define a separation factor Sf which expresses the relative enrichment in n-butane of the phase that has traversed the membrane:

$$Sf=[(P_{nC4})_p/(P_{nC4})_o]/[(P_{H2})_p/(P_{H2})_o]$$

Where indices p and o respectively characterize the permeate (phase that has traversed the membrane, enriched in hydrocarbon compound) and the feed. Measuring the concentrations or partial pressures enable the n-butane/hydrogen separation factors at ambient temperature to be determined. The higher the separation factor, the better the quality of the membrane material.

Table 2 summarises the separation performance of the materials prepared using the protocol described in Example 1. Tests were carried out in an isobaric permeator at 1.2 bars in the presence of nitrogen at ambient temperature. The concentrations of the gas in each phase (feed and permeate) were measured by in-line chromatographic analysis.

TABLE 2

Performances of membranes prepared in accordance with Example 1 in separating a mixture containing n-butane/hydrogen gas. Feed $nC_4H_{10}/H_2/N_2$: 12/15/73 molar (75 ml/min, 1.2 bars), downstream flushing of nitrogen at 1.2 bars.

| Membranes | Sf at 20° C. ($nC_4H_{10}/H_2$ separation factor) |
|---|---|
| A | 180.0 |
| B | 142.0 |
| C | 150.0 |

In all cases, the separation factors Sf were very high, meaning a strong enrichment in butane hydrocarbon of the permeate (phase that has traversed the membrane) with respect to the feed. In general, it is estimated that for a separation factor of more than 25, materials are of very good quality. The results obtained thus demonstrate the high quality of the membrane materials prepared in accordance with the process of the invention. Taking the adsorption/diffusion properties of the gas-zeolite system described above into account, these results are witness to the very high quality of the membrane materials obtained. This mode of preparation thus allows membranes with a very high textural integrity to be produced in a single hydrothermal preparation step by crystallising a relatively small mass of solid by significantly limiting the thickness of the material, which is of particular advantage from an industrial viewpoint, primarily in terms of the cost of starting materials, investment (dimensions of production tool) and operating costs.

Example 5

Separation Performance of Zeolitic Membrane Materials Prepared in Accordance with the Prior Art With the aim of comparing the quality of membranes prepared in accordance with the invention by programmed temperature crystallisation with that of membranes prepared by the isothermal route, six membranes (references E to J) were prepared using the preparation method described in Example 2, i.e., using an isothermal procedure. The performances of these materials were measured in a manner that was rigorously identical to the protocol of Example 4. The permeation results are shown in Table 3.

TABLE 3

Performances of membranes prepared in accordance with Example 2 in separating a mixture containing n-butane/hydrogen gas. Feed $nC_4H_{10}/H_2/N_2$: 12/15/73 molar (75 ml/min, 1.2 bars), downstream flushing of nitrogen at 1.2 bars.

| Membranes | Sf at 20° C. ($nC_4H_{10}/H_2$ separation factor) |
|---|---|
| E | 3.6 |
| F | 5.0 |
| G | 4.7 |
| H | 5.9 |
| I | 2.6 |
| J | 1.2 |

In all cases, the separation factors obtained were very low and clearly inferior to those obtained with the membrane materials prepared using the process of the invention. This means that membranes E to J only allowed partial separation, or even no molecule separation at all (membrane J). As a result, the selectivity of these membranes E to J was very low. Taking the adsorption/diffusion properties of the gas/zeolite system described above into account, these results are witness to the presence of defects in the structure of membranes E to J, obtained using the isothermal preparation process.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for preparing a supported zeolite membrane comprising a composite continuous zeolite/support layer of controlled thickness, wherein the zeolite is principally localized in pores of a porous support and optionally on the external surface thereof, wherein said method comprises forming a precursor gel of said zeolite, contacting said porous support with said gel and crystallizing said zeolite, wherein said zeolite is crystallised by carrying out a non-isothermal thermal program comprising at least three steps in succession: a first constant temperature stage carried out at a temperature in the range of 50° C. to 300° C., followed by cooling step to a temperature of less than 50° C., itself followed by a second constant temperature stage carried out at a temperature in the range of 50° C. to 300° C.

2. A process for preparing a supported zeolite membrane according to claim 1, wherein the first constant temperature stage is carried out at a temperature in the range of 80° C. to 220° C.

3. A process for preparing a supported zeolite membrane according to claim 1, wherein the first constant temperature stage is maintained for a period in the range of 1 hour to 15 days.

4. A process for preparing a supported zeolite membrane according to claim 1, wherein the second constant temperature stage is carried out at a temperature in the range of 80° C. to 220° C.

5. A process for preparing a supported zeolite membrane according to claim 1, wherein the second constant temperature stage is carried out at a temperature equal to that of the first constant temperature stage.

6. A process for preparing a supported zeolite membrane according to claim 1, wherein the second constant temperature stage is maintained for a period in the range of 1 hour to 15 days.

7. A process for preparing a supported zeolite membrane according to claim 1, wherein said cooling step is carried out to ambient temperature.

8. A process for preparing a supported zeolite membrane according to claim 1, wherein the support comprises a porous material with pore diameters in the range of 4 nanometres to 100 micrometers, and wherein the fraction of the total pore volume is more than 5%.

9. A process for preparing a supported zeolite membrane according to claim 1, wherein the support comprises an inorganic, organic or mixed material and is selected from the following materials: alumina- and/or zirconia- and/or titanium oxide-based ceramic, metals, glasses, carbon, silica, zeolites, clays and polymers.

10. A process for preparing a supported zeolite membrane according to claim 9, wherein the support geometry is planar, tubular, or in the form of a coil or fibers.

11. A process for preparing a supported zeolite membrane according to claim 1, wherein precursors for the zeolite comprise silicon and/or aluminium alkoxides and/or silicon tetrachloride and/or aluminium trichloride.

12. A process for preparing a supported zeolite membrane according to claim 11, wherein the precursors for the zeolite are within a solution which additionally comprises one or more of the following elements: a polar organic molecule, one or more aids to the reaction for forming said precursor gel of said zeolite, or one or more aids for crystallising said zeolite.

13. A supported zeolite membrane comprising a composite continuous zeolite/support layer of controlled thickness, the zeolite of which is principally localized in the pores of said porous support, obtained by a method as described in claim 1.

14. A membrane according to claim 13, in which the zeolite formed results from a concatenation of $TO_4$ tetrahedra where T is at least one element selected from Si, Al, B, Ga, Ge and P.

15. A membrane according to claim 13, in which the zeolite formed is part of one of the following structural families: FAU, GME, MOR, OFF, MFI, MEL, FER, LTA and CHA.

16. A membrane according to claim 13, in which the zeolite formed results from a concatenation of $TO_6$ octahedra where T is at least one element selected from Ti, Mn and Mo.

17. A membrane according to claim 13, in which the thickness of said continuous zeolite layer is in the range 0.5 to 100 $\mu$m.

18. A method for separating a gas or vapor which comprises passing a gas or vapor comprising at least two components through a membrane according to claim 13 under such conditions that at least one component passes through the membrane at a higher rate than at least one other component.

19. A method for separating a liquid which comprises passing a liquid through a membrane according to claim 13 under prevaporation, filtration or electrophoresis conditions.

* * * * *